United States Patent
Siegel et al.

(10) Patent No.: US 10,986,064 B2
(45) Date of Patent: *Apr. 20, 2021

(54) ASCERTAINING EVENTS IN MEDIA

(71) Applicant: IMDB.com, Inc., Seattle, WA (US)

(72) Inventors: Hilliard Bruce Siegel, Seattle, WA (US); Kenneth P. Fishkin, Seattle, WA (US)

(73) Assignee: IMDB.COM, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/698,746

(22) Filed: Sep. 8, 2017

(65) Prior Publication Data

US 2018/0013711 A1     Jan. 11, 2018

Related U.S. Application Data

(63) Continuation of application No. 14/617,043, filed on Feb. 9, 2015, now Pat. No. 9,794,212, which is a continuation of application No. 13/532,234, filed on Jun. 25, 2012, now Pat. No. 9,015,744.

(51) Int. Cl.
| | |
|---|---|
| *H04L 12/26* | (2006.01) |
| *H04L 12/58* | (2006.01) |
| *H04N 21/4784* | (2011.01) |
| *H04N 21/24* | (2011.01) |
| *H04N 21/475* | (2011.01) |
| *H04N 21/478* | (2011.01) |
| *H04N 21/8547* | (2011.01) |
| *H04L 29/08* | (2006.01) |
| *H04N 21/482* | (2011.01) |

(52) U.S. Cl.
CPC .............. *H04L 51/32* (2013.01); *H04L 67/22* (2013.01); *H04N 21/2408* (2013.01); *H04N 21/4758* (2013.01); *H04N 21/4781* (2013.01); *H04N 21/4784* (2013.01); *H04N 21/8547* (2013.01); *H04N 21/4826* (2013.01)

(58) Field of Classification Search
CPC ..... H04L 51/32; H04L 67/22; H04N 21/8547; H04N 21/4758; H04N 21/2408; H04N 21/4781; H04N 21/4784; H04N 21/4826
See application file for complete search history.

(56) References Cited

U.S. PATENT DOCUMENTS

| | | | | |
|---|---|---|---|---|
| 5,638,113 A | * | 6/1997 | Lappington | A63F 13/12 348/E7.031 |
| 5,697,844 A | | 12/1997 | Von Kohorn | |
| 5,907,323 A | * | 5/1999 | Lawler | H04N 21/4316 725/41 |
| 5,916,024 A | | 6/1999 | Von Kohorn | |
| 6,443,840 B2 | | 9/2002 | Von Kohorn | |
| 7,086,075 B2 | | 8/2006 | Swix et al. | |

(Continued)

*Primary Examiner* — Michael Won
(74) *Attorney, Agent, or Firm* — Thomas | Horstemeyer, LLP

(57) ABSTRACT

Disclosed are various embodiments relating to the identification of events that occur within a media item. In one embodiment, among others, a media item is rendered for display on client devices. A plurality of messages are received from client devices, wherein each of the messages comprises a timestamp indicating a time relative to a media item. The existence of an event in the media item is determined based at least in part on a clustering of at least a subset of the messages received.

20 Claims, 6 Drawing Sheets

(56) References Cited

U.S. PATENT DOCUMENTS

| | | |
|---|---|---|
| 7,269,835 B2 | 9/2007 | Swix et al. |
| 7,293,065 B2 | 11/2007 | Banister et al. |
| 7,543,322 B1* | 6/2009 | Bhogal ............... H04N 5/44543 725/38 |
| 7,703,044 B2* | 4/2010 | Graham ............... G06F 3/1206 358/1.1 |
| 8,010,466 B2* | 8/2011 | Patinkin ............... H04L 51/12 706/12 |
| 8,468,556 B2 | 6/2013 | Swix et al. |
| 8,910,188 B1* | 12/2014 | Wang ............... G06F 13/00 719/318 |
| 9,015,744 B1* | 4/2015 | Siegel ............... H04N 21/4784 725/23 |
| 9,021,515 B2* | 4/2015 | Lee ............... G06Q 30/02 725/9 |
| 9,503,717 B2* | 11/2016 | Sze ............... H04N 19/91 |
| 9,596,207 B1* | 3/2017 | Lin ............... H04L 51/32 |
| 9,794,212 B2* | 10/2017 | Siegel ............... H04N 21/4784 |
| 10,291,942 B2* | 5/2019 | Viles ............... H04N 21/23424 |
| 2004/0268381 A1* | 12/2004 | Simelius ............... A63F 13/12 725/19 |
| 2005/0124290 A1* | 6/2005 | Bostrom ............... H04M 1/72522 455/3.06 |
| 2005/0262540 A1 | 11/2005 | Swix et al. |
| 2006/0045115 A1* | 3/2006 | Nix ............... H04L 29/06027 370/432 |
| 2006/0218187 A1* | 9/2006 | Plastina ............... G06F 17/30029 |
| 2007/0199014 A1* | 8/2007 | Clark ............... H04N 5/44543 725/30 |
| 2007/0276729 A1* | 11/2007 | Freer ............... G06Q 30/02 705/14.44 |
| 2008/0077482 A1* | 3/2008 | Tota ............... G06Q 10/063 705/300 |
| 2008/0201159 A1* | 8/2008 | Gabrick ............... G06F 17/30011 705/1.1 |
| 2009/0089352 A1* | 4/2009 | Davis ............... G06Q 10/00 709/201 |
| 2009/0183205 A1* | 7/2009 | McCartie ............... H04H 60/65 725/56 |
| 2010/0122274 A1 | 5/2010 | Gillies et al. |
| 2011/0135278 A1* | 6/2011 | Klappert ............... G06F 17/241 386/278 |
| 2011/0256520 A1* | 10/2011 | Siefert ............... G09B 5/10 434/322 |
| 2011/0289422 A1* | 11/2011 | Spivack ............... G06Q 10/109 715/739 |
| 2011/0292996 A1* | 12/2011 | Jayant ............... H04N 19/00 375/240.03 |
| 2011/0300832 A1* | 12/2011 | Shaw ............... G06Q 30/0261 455/412.1 |
| 2012/0079380 A1* | 3/2012 | Tsai ............... G06F 16/40 715/716 |
| 2012/0093481 A1* | 4/2012 | McDowell ............... G11B 27/105 386/241 |
| 2012/0124152 A1* | 5/2012 | Kuo ............... H04L 51/36 709/206 |
| 2012/0226743 A1* | 9/2012 | Smargon ............... G06Q 20/06 709/203 |
| 2012/0290730 A1* | 11/2012 | Desai ............... H04L 67/104 709/228 |
| 2013/0060708 A1* | 3/2013 | Oskolkov ............... G06Q 20/10 705/75 |
| 2013/0132865 A1 | 5/2013 | Li |
| 2013/0198642 A1* | 8/2013 | Carney ............... G06F 3/0484 715/738 |
| 2013/0254788 A1 | 9/2013 | Swix et al. |
| 2013/0268357 A1 | 10/2013 | Heath |
| 2013/0316324 A1* | 11/2013 | Hoffmann ............... G09B 7/00 434/362 |
| 2013/0325927 A1 | 12/2013 | Corbett et al. |
| 2013/0346867 A1* | 12/2013 | Woods ............... G11B 27/34 715/728 |
| 2014/0089801 A1* | 3/2014 | Agrawal ............... G06F 3/0484 715/719 |
| 2014/0304043 A1* | 10/2014 | Tota ............... G06F 17/30029 705/12 |
| 2014/0317653 A1* | 10/2014 | Mlodzinski ............... H04N 21/812 725/32 |
| 2015/0128162 A1* | 5/2015 | Ionescu ............... H04N 21/44209 725/14 |
| 2015/0221177 A1* | 8/2015 | Glancy ............... G07F 17/3223 463/25 |
| 2015/0294633 A1* | 10/2015 | Jung ............... H04L 51/32 345/212 |
| 2015/0295879 A1* | 10/2015 | Jung ............... H04L 51/32 709/204 |
| 2015/0312838 A1* | 10/2015 | Torres ............... H04B 7/18582 370/329 |
| 2016/0014477 A1* | 1/2016 | Siders ............... H04N 21/2747 725/32 |
| 2016/0301960 A1* | 10/2016 | Sze ............... H04N 21/2402 |
| 2017/0083935 A1* | 3/2017 | Maughan ............... G06Q 30/0244 |
| 2017/0201779 A1* | 7/2017 | Publicover ............... H04W 4/21 |
| 2017/0228501 A1* | 8/2017 | Turner, Jr. ............... G06F 19/325 |
| 2018/0014090 A1* | 1/2018 | Venkatraman ............... H04N 21/232 |

* cited by examiner

ASCERTAINING EVENTS IN MEDIA

CROSS-REFERENCE TO RELATED APPLICATIONS

This application is a continuation of, and claims priority to, co-pending U.S. Patent Application entitled "ASCERTAINING EVENTS IN MEDIA," filed on Feb. 9, 2015 and assigned application Ser. No. 14/617,043, which is a continuation application that claims priority to U.S. Pat. No. 9,015,744 entitled "ASCERTAINING EVENTS IN MEDIA," issued on Apr. 21, 2015 and filed on Jun. 25, 2012, which are entirely incorporated herein by reference.

BACKGROUND

Data collection is used to obtain information to keep on record, to make decisions about important issues, and to pass information on to others and for other purposes. Data validity and verification are concepts used to assess data reliability. Various techniques may be employed in order to verify the accuracy of information on any scale.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to the identification and verification of information and events that occur within a media item. For example, media items may include movies, television shows, broadcasts, audio files, and/or other media items. In some embodiments, a media application may be executed by a computing device such as a server. One or more users may manipulate a client to interface with the media application. The media application transmits a media item to the clients and generates one or more requests about the media item. For example, requests may involve determining when events occur in the media item and/or other requests.

In response to the request, one or more users may submit a reply. In this respect, in one embodiment a contest may be staged between users to be the first user to identify when an event occurs in a media item. Each of the replies may include a timestamp that is representative of a point in time in the respective one of the media items that the user generated the reply. Also, a reply may be a simple notation of when a button was manipulated by the user. Alternatively, a reply may include a comment or other information provided by the user. Upon receipt of the replies, the media application may confirm that the event occurred at or near a specific point in time relative to the duration of the media item by comparing the timestamps included in each of the replies to determine whether each of the replies were received close together. For example, the media application may check for corroboration in the form of replies that include timestamps that are less than five seconds apart.

Once the media application has made a determination that the event occurred at or near a specific point in time in the media item, the media application determines whether a reply to the request is deemed to be accurate. For example, the media application may determine that a reply is deemed to be accurate based at least in part on a validation score. In one embodiment, the reply having a validation score greater than or equal to a predefined threshold score is deemed to be accurate. The media application may then award an amount of points to each of the respective user accounts that submitted an accurate reply. In another embodiment, the media application may subtract an amount of points from each of the respective user accounts that submitted a reply that was not deemed to be accurate. The amount of points may be determined based at least in part on a proximity of the respective user reply relative to a cluster of other user replies, or points may be determined based on the content of a comment submitted as the reply by a user. In the following discussion, a general description of the system and its components is provided, followed by a discussion of the operation of the same.

Figure 1:
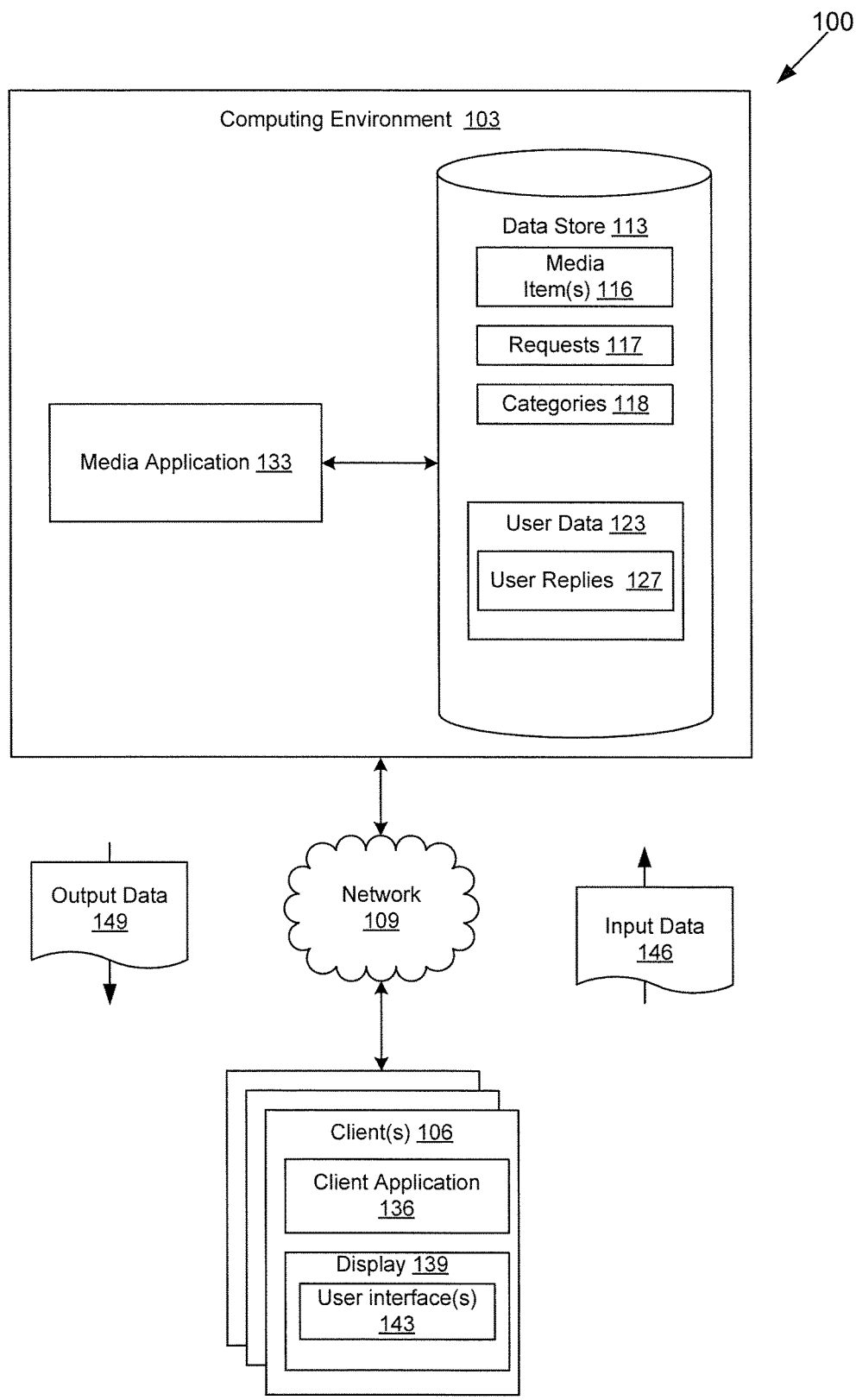
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more clients 106 by way of network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may comprise a plurality of servers or other computing devices may be employed that are arranged, for example, in one or more server banks or computer banks or other arrangements. For example, the computing environment 103 may comprise a cloud computing resource, a grid computing resource, and/or any other distributed computing arrangement. Such computing environment 103 may be located in a single installation or may be distributed among many different geographical locations.

Various applications and/or other functionality may be executed in the computing environment 103 according to various embodiments. Also, various data is stored in a data store 113 that is accessible to the computing environment 103. The data store 113 may be representative of a plurality of data stores as can be appreciated. The data stored in the data store 113, for example, is associated with the operation of the various applications and/or functional entities described below.

The components executed on the computing environment 103, for example, include media application 133, and other applications, services, processes, systems, engines, or functionality not discussed in detail herein. The media application 133 may be executed to transmit one or more media items 116 and generate requests 117 about events that occur in each of the media items 116. The media application 133 may communicate with the client 106 over various protocols such as, for example, hypertext transfer protocol (HTTP), simple object access protocol (SOAP), real-time transport protocol (RTP), real time streaming protocol (RTSP), real time messaging protocol (RTMP), user datagram protocol (UDP), transmission control protocol (TCP), and/or other protocols for communicating data over the network 109. Additionally, the media application 133 may generate various streaming or otherwise transmitted content such as, for example, movies, television shows, sports broadcasts, news broadcasts, and/or other linear stream media programs.

The data stored in the data store 113 includes, for example, media items 116, requests 117, categories 118, user data 123, user replies 127, and/or potentially other data. The media items 116 may include video content, audio/video content, and/or other content as can be appreciated. Requests 117 may include questions regarding events that occur in the media item 116 and/or other information related to events that occur in the media item 116. Categories 118 may be used to identify at least a subset of the media items 116 and at least a subset of requests 117 from the data store 113 to present to the user. For example, a category may include information such as, a movie title, a name of an actor, a type of film genre, and/or other category designations as can be appreciated.

User data 123 includes various data associated with a user of a client 106 to interact with the media application 133. User data 123 comprises data about the user of the client 106 that is authorized to receive the media items 116. Such user data 123 may include information such as, usernames, passwords, security credentials, authorized applications, and/or other data. User data 123 can also include one or more third party systems with which the user is associated. In one embodiment, a user of the media application 133 can link one or more third party sites with an account of the user, which can allow the media application 133 to access content associated with the user from the third party site as well as potentially publish information about the user's interaction with media application 133 and/or other interests in the third party site.

The user data 123 may also include information associated with user replies 127. User replies 127 are the individual responses of each user to each of the requests 117. Each reply 127 may include comments or other feedback from each of the users and/or other information as will be described. The user data 123 may also include information associated with each of the media items 116 that were transmitted to the client 106 of a respective user. In this respect, the user data 123 may provide a history of the media items 116 transmitted to the client 106 of a respective user.

For example, when a media item 116 is first transmitted to a user, the media application 133 is configured to generate a new entry in the user data 123 such that the specific user feedback associated with such media item 116 can be stored for future reference. Additionally, media items 116 and requests 117 that have been viewed and/or otherwise accessed by a user of a client 106 may be stored as part of the user data 123. To this end, the media application 133 facilitates monitoring the frequency at which a user is presented with a particular media item 116, a request 117, and/or other information.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, web pads, tablet computer systems, game consoles, or other devices with like capability.

The client 106 may include a display device 139 and may also include one or more input devices. Such input devices may comprise, for example, devices such as keyboards, mice, joysticks, accelerometers, light guns, game controllers, touch pads, touch sticks, push buttons, optical sensors, microphones, webcams, and/or other devices that can provide user input. To this end, the client application 136 is configured to receive input provided by the user and send this input over the network 109 to the computing environment 103 as input data 146. The client side application 133 is also configured to obtain output data 149 such as, for example, video, audio, and/or other data over the network 109 from the computing environment 103 and render the same on the client 106.

The client 106 may be employed to execute a client application 136, and/or other applications. The client application 136 may be executed in a client 106, for example, to access and render network pages, such as web pages, or other network content served up by the computing environment 103 and/or other servers. In this respect, the client application 136 may comprise a browser and/or other applications. In one embodiment, the client application 136 may comprise a plug-in within a browser application. The client application 136 may also comprise a dedicated application.

The client 106 may be configured to execute applications beyond client application 136 such as, for example, email applications, instant message applications, and/or other applications. When executed, the client application 136 renders one or more user interfaces 143 on the display device 139 of the client 106 in order to enable a user that manipulates such client 106 to interact with media application 133 as will be described.

Next, a general description of the operation of the various components of the networked environment 100 is provided. To begin, a user manipulates a client 106 to interact with the media application 133 executed in the computing environment 103. The media application 133 is executed in the computing environment 103 to serve up media items 116 and transmit requests 117 to clients 106 over a network 109 and perform other functions as will be described. In one embodiment, the media application 133 stages a contest between users to facilitate the identification of when an event occurs in the respective media item 116, or to accomplish some other purpose with respect to the media item 116. An event may comprise an occurrence of a predefined video or audio sequence, an appearance of an object or sound, or any other localization of an aspect of a media item 116. In one embodiment, different versions of the same media item 116 may be presented to each of the users, such as, for example, audio only versions of the media item 116, video only versions of the media item 116, media items 116 with subtitles, versions of media items 116 with audio or video elements obscured or otherwise altered, and/or other altered versions of the media item 116. Additionally, the media application 133 may facilitate the creation of a user data 123 by providing one or more user interfaces 143 to facilitate entry of user data 123. For instance, the media application 133 may prompt the user to specify a name, a password, an address, billing information, and/or any other parameter or user information for establishing the user data 123.

Additionally, one or more user interfaces 143 may be served up and rendered on the client application 136 to facilitate the selection of one or more categories associated with the requests 117 to be transmitted to the client 106. In one embodiment, a selection of a category is received from the client 106 that used to identify a subset of requests 117 from the data store 113 to present to the user. For example, a category may include information such as a movie title, a name of an actor, a type of film genre, and/or other categories as can be appreciated.

In one embodiment, the media application 133 generates one or more requests 117 associated with the transmitted media item 116. For example, requests 117 may include inquiries regarding when events occur in the media item 116, and/or other information related to events that occur in the transmitted media item 116. In response to the selection of a category, the media application 133 determines an order of transmission of each of the requests 117 to be transmitted. For example, different requests 117 may be generated by the media application 133 relating to the same media item 116. To this end, the priority of requests 117 transmitted to the user may be modified as a function of client interaction with the media application 133.

Next, the media application 133 may encode for display each of the requests 117. Each of the requests 117 may then be transmitted simultaneously to users of one or more of clients 106 that are viewing or will view a media item 116 at the same time. The media application 133 then facilitates receipt of one or more user replies 127 from one or more clients 106. User replies 127 are the individual responses of each user to each of the requests 117. In one embodiment, each of the user replies 127 includes a timestamp that is representative of a point in time in the respective one of the media items 116 that the user generated the user reply 127.

Upon receipt of the user replies 127, the media application 133 may confirm that the event occurred at or near a specific point in time relative to the duration of the media item 116 by examining the timestamps included in each of the user replies 127 to determine whether each of the user replies 127 were received close together. For example, the media application may check for corroboration in the form of user replies 127 that include timestamps that are less than five seconds or other time period apart as will be described. In addition, the media application 133 may perform an analysis of comments submitted as part of the replies 127 for keywords or other information that relates in some pertinent way to the media item 116.

The media application 133 then determines whether the user replies 127 are deemed to be accurate. In one embodiment, each of the requests 117 is transmitted simultaneously to one or more users of clients 106 that are viewing or will view a media item 116 at the same time. A contest is thus staged where each of the users may participate as contestants submitting a user reply 127 in response to each of the requests 117. When a user submits a user reply 127, other users viewing the same media item 116 and the same request 117 may be notified that the respective user has submitted a user reply 127. The first notification sent in response to a receipt of the first answer by a user may serve as a prompt for other users to submit a user reply 127 assuming that they agree with the first user.

Upon receipt of the user replies 127, the media application 133 may examine the timestamps included in each of the user replies 127. Assuming each of the user replies 127 are received within a predefined amount of time, the user reply 127 may be deemed to be accurate based at least in part on the number of user replies 127 received within the predefined amount of time as will be described. Stated another way, in response to the user reply 127, the media application 133 checks for corroboration in the form of other timestamps that are close together, such as, for example, timestamps that are received within a predefined time period.

In one embodiment, the media application 133 uses the number of timestamps that are close together as an indication that the event occurred at or near the point in time in the media item 116 where most of the timestamps are clustered. As part of the contest, the media application 133 may then award an amount of points to one or more of the users based at least in part on a validation score associated with each of the user replies 127. The validation score may reflect how close in time the timestamp associated with the respective one of the user replies 127 represents the actual time of the occurrence of an event. The user reply 127 having a validation score greater than or equal to a predefined threshold score is deemed to be accurate.

The media application 133 may also award an amount of points based at least in part on a respective one of the users being the first, second, or third or other place to submit a user reply 127 assuming that the answers are deemed correct. For example, once the media application 133 has determined that the event occurred at or near a specific point in time in the media item 116 based at least in part on a clustering of the timestamps received, the media application 133 may then award a predefined amount of points to the first user that submitted a user reply 127 at or near the specific point in time. Additionally, the media application 133 may award other amounts of points to users that submitted a user reply 127 second, third, fourth, etc. Similarly, the media application 133 may subtract an amount of points from each of the respective user accounts that submitted a user reply 127 that was not deemed to be accurate. The amount of points may be determined based at least in part on a proximity of the respective user reply 127 relative to a cluster of other user replies 127.

In another embodiment, each of the requests 117 is transmitted to one or more users of clients 106 at different points in time. In response to each of the requests 117, a user of a client 106 may submit a user reply 127. The media application 133 may then 133 store and examine the timestamps included in each of the user replies 127. The media application 133 checks for verification in the form of other timestamps that are close in time relative to the actual time that an event occurred in the media item 116. The media application 133 may then award an amount of points to the user based at least in part on whether the respective one of the user replies 127 is deemed to be accurate.

Figure 2:
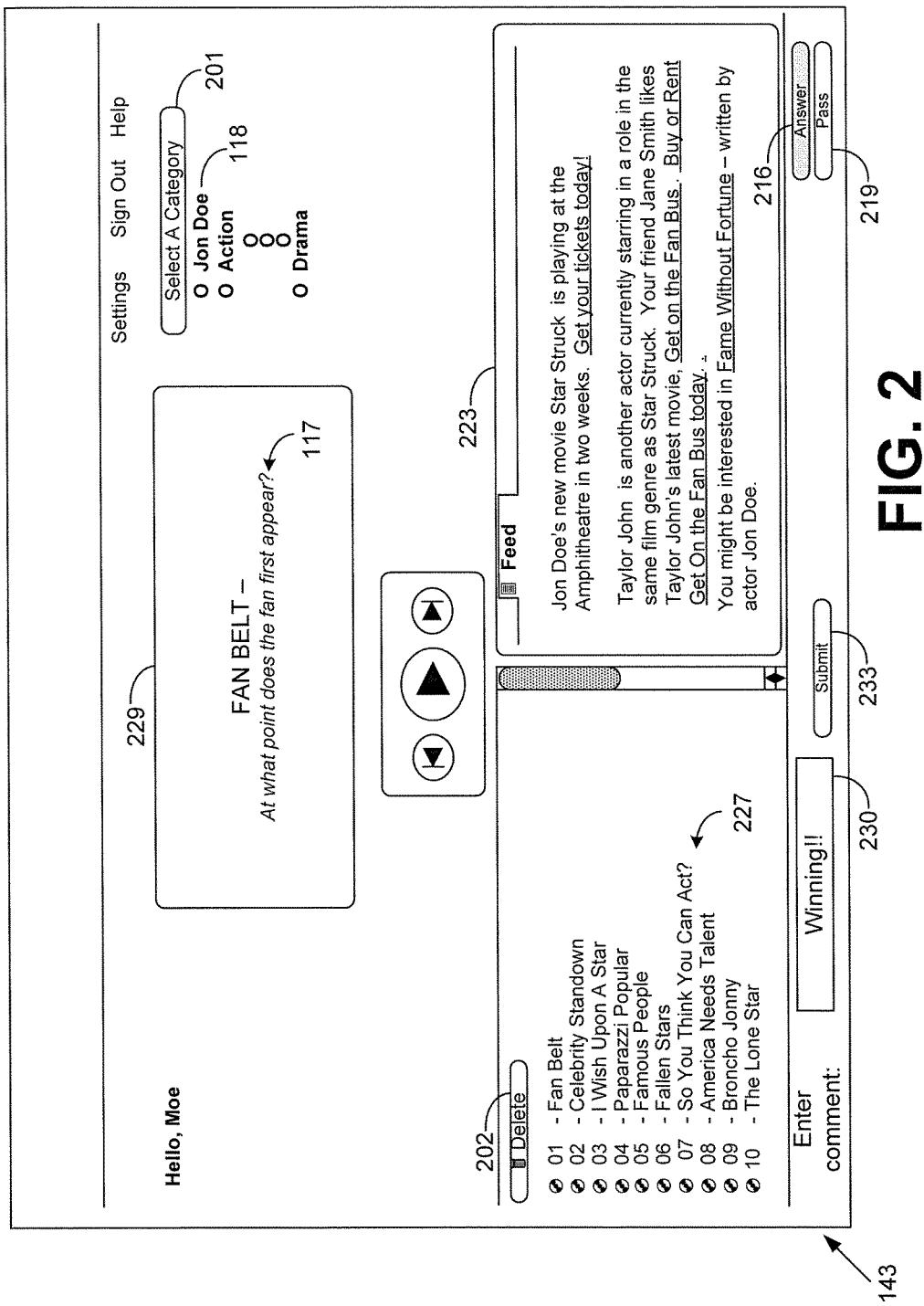
FIG. 2 is a drawing of an example of a user interface rendered by a client in the networked environment of FIG. 1 according to various embodiments of the present disclosure.

Referring next to FIG. 2, shown is one example of a user interface 143 according to various embodiments. The user interface 143 is rendered, for example, on a display 139 (FIG. 1) associated with a respective client 106 (FIG. 1) implemented by a client application 136 (FIG. 1). The user interface 143 depicts a visual playlist 227 of the media items 116 (FIG. 1) that are slated to be transmitted to the client 106 as described above. At the top of the visual playlist 227 is a currently transmitted one of the media items 116 that may be highlighted or differentiated from the remaining media content items 116 in the visual playlist 227 in some other manner.

Alternatively, in one embodiment, a user may delete a selected one of the media items 116 in the visual playlist 227 by selecting a media item 116 to be removed from the visual playlist 227 and clicking the "delete" button 202, media items 116 may be deleted in some other manner. Also, the user interface 143 includes a category selector 201 so that a user may select a category used to identify a subset of the requests 117 (FIG. 1) associated with the media item 116.

The user interface 143 may also include one or more requests 117 associated with the transmitted one of the media items 116. In one embodiment, a user may submit a user reply 127 (FIG. 1) to a request 117 by clicking the "answer" button 216. The user interface 143 further includes a social network module 223 that publishes information relating to the media item 116 currently being transmitted. The social network module 223 may also display information relating to media items 116 that have not been transmitted. Further, the social network module 223 may be employed for a user of a client 106 to communicate with other users relative to the media item 116 or for other purposes. Additionally, users who are linked to other users in a social networking system may desire to view the media consumption activity and/or previously answered requests of other users.

As a non-limiting example, a user of a third party system can publish content that can be viewable to other users linked to the user. In some third party systems, for example, the content can be available to "friends", "followers", and/or other users in the publisher's "social network." In other words, a user can publish a "feed", which can be available to other users in the third party system. The social network module 223 may display data regarding other users to which a user is linked as well as information about the media items 116 in which the user may have an interest. The social network module 223 can provide this data in real time as a user is interacting with the user interface 143. The user interface 143 also includes a viewing window 229 that displays the respective one of the media items 116 that is currently being transmitted to the client 106. Additionally, the user interface 143 may include a text box 230 that facilitates the entry of a user reply 127 that includes a comment, user feedback and/or other information from a user of a client 106. A submit button 233 is included in the user interface 143 so that a user may submit a user reply 127 that includes a comment, user feedback and/or other information.

In one embodiment, in order to manipulate the components of the user interface 143, a user may "click" one of the components depicted in the user interface 143 by positioning a cursor over a given component and manipulating a button on a mouse associated with a client 106. Alternatively, other approaches may be used to manipulate the various buttons, icons, or other components of the user interface 143 as can be appreciated. For example, a user may "click" the category selector 201 to choose one of the predefined categories 118. After a user has selected one of the predefined categories 118, a visual playlist 227 comprising a subset of the media items 116 and/or requests 117 that fall within one or more of the category designations is rendered for display on the client 106.

Figure 3:
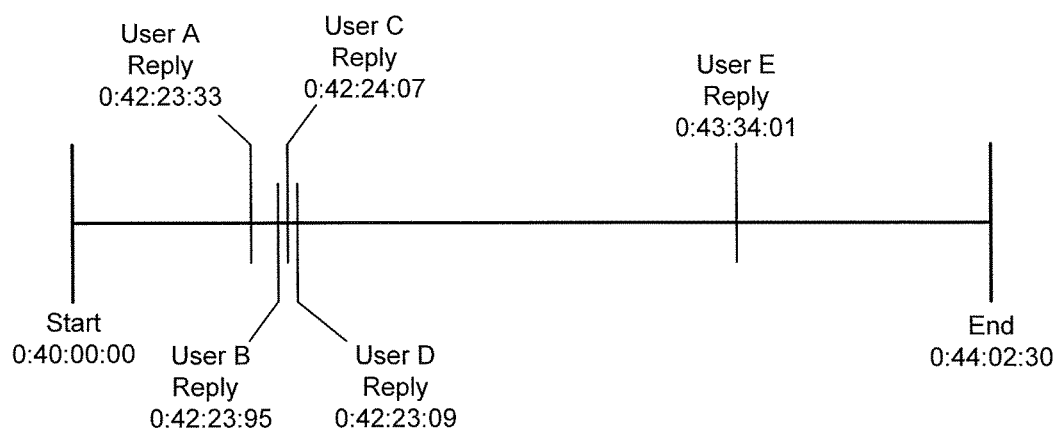
FIG. 3 is a drawing of an example of a timeline representative of a length of one of the media items of FIG. 1 according to various embodiments of the present disclosure.

Moving on to FIG. 3, shown is one example of a timeline representative of a length of one of the media items 116 (FIG. 1). Each of the users may participate as contestants thereby submitting a user reply 127 (FIG. 1) in response to each of the requests 117 (FIG. 1). In one embodiment, the media application 133 sends a media item 116 and a respective request 117 simultaneously to two or more users of a client 106 (FIG. 1). When a user submits a user reply 127, other users viewing the same media item 116 and the same request 117 may be notified that the respective user has submitted a user reply 127. This notification may serve as a prompt for other users to submit a user reply 127 assuming that they agree with the first user. Upon receipt of the user replies 127, the media application 133 (FIG. 1) examines the timestamps included in each of the user replies 127.

Assuming each of the user replies 127 are received within a predefined amount of time, the user reply 127 may be deemed to be accurate based at least in part on the number of user replies 127 received within the predefined amount of time. In response to the user reply 127, the media application 133 checks for corroboration in the form of other timestamps that are close together, such as, for example, timestamps that are received less than five seconds apart. In one embodiment, the media application 133 uses the number of timestamps that are close together as an indication that the event occurred just before or near the point in time in the media item 116 where most of the timestamps are clustered given an average reaction time it takes for a human to recognize an event and physically respond.

As part of the contest, the media application 133 may then award an amount of points to one or more of the users based at least in part on a validation score associated with each of the user replies 127. Each of the user replies 127 may include a timestamp that is used to identify that a certain event occurred within a media item 116 at a specific point in time. The validation score may reflect how close in time the timestamp associated with the respective one of the user replies 127 represents the actual time of the occurrence of an event.

The media application 133 may also award an amount of points based at least in part on the placement of a user reply 127 relative to the user replies 127 of other users. For example, once the media application 133 has determined that the event occurred at or near a specific point in time in the media item 116, the media application 133 may then award a predefined amount of points to the first user that submitted a user reply 127 at or near the specific point in time. Additionally, the media application 133 may award other amounts of points to users that submitted a user reply second, third, fourth, etc.

In addition, it may be the case that the location of an event in a media item 116 cannot be discerned from the user replies 127. For example, if such user replies 127 are spread out throughout the media item 116, they cannot be used to corroborate their respective answers as is the case when user replies 127 are clustered together. In addition, when less than all of the user replies 127 in a contest cluster at a relative point, but others do not, those that do not cluster may be deemed outliers that are ignored. In one embodiment, in order for a cluster to be deemed an accurate measure of the location of an event in a media item 116, a threshold percentage or number of user replies 127 relative to the entire number of user replies 127 received in the contest must appear in the cluster. In addition, other approaches may be employed.

In another embodiment, a media item 116 and a respective request 117 are transmitted serially and/or separately in time to a number of users. In this embodiment, the media application 133 receives each of the user replies 127 separately from each user of a client 106. Consequently, each user answers requests 117 individually without being in a contest simultaneously with others. In this respect, the media application 133 continues to obtain user replies 127 from different users regarding a respective request 117 until a requisite number of user replies 127 has been received such that the location of the occurrence of an event in the media item 116 can be ascertained. Once a requisite number of user replies 127 has been obtained by the media application 133, the media application 133 examines the timestamps in each of the user replies 127 to determine whether there is an indication that an event occurred at or near a specific point in time where most of the timestamps are clustered together. Additionally, it may be the case that the location of the occurrence of an event in a media item 116 cannot be ascertained from the user replies 127 as discussed above.

Figure 4:
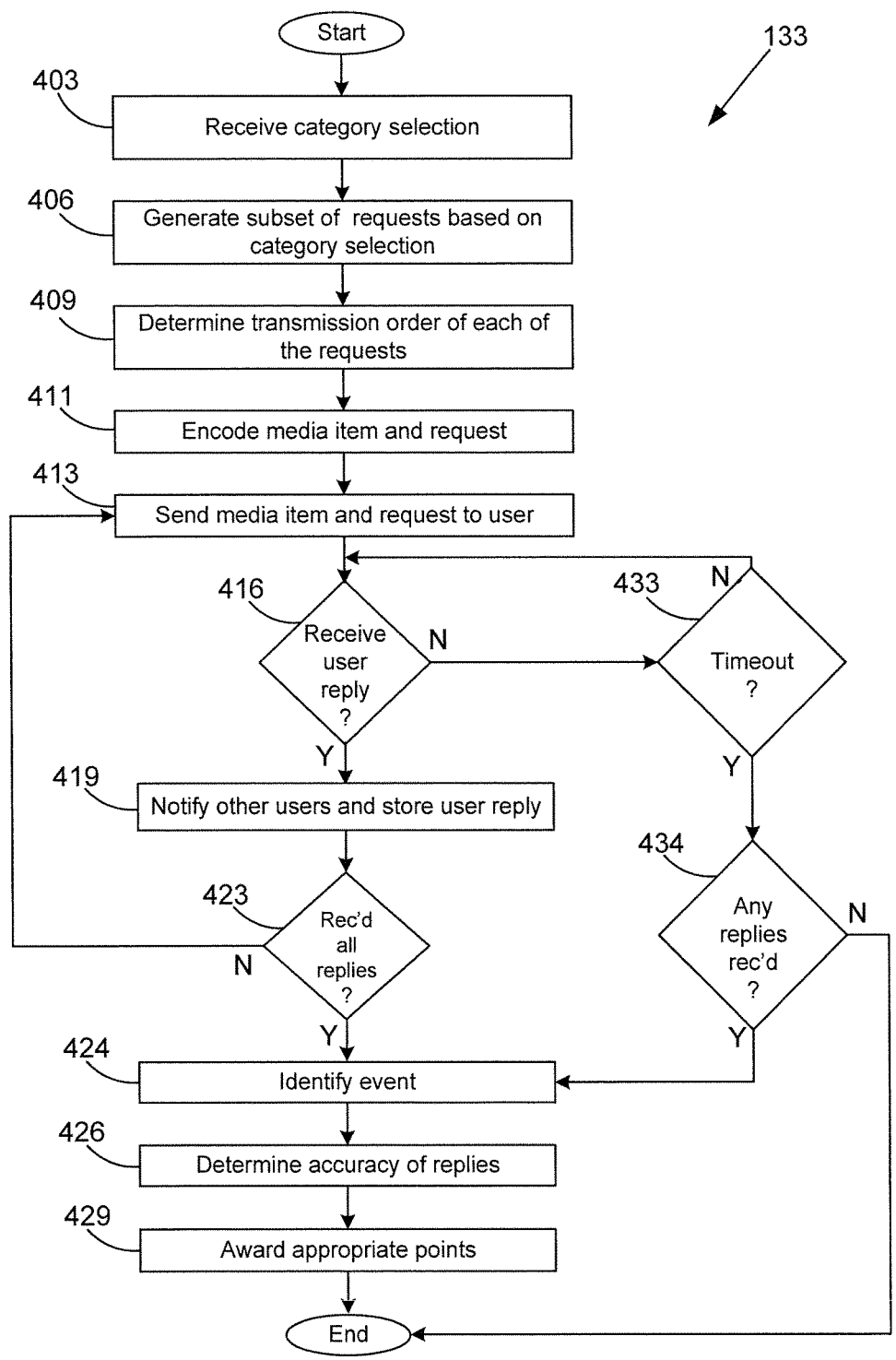
FIGS. 4 and 5 are flowcharts illustrating examples of functionality implemented as portions of a media application executed in a computing environment in the networked environment of FIG. 1 according to various embodiments of the present disclosure.

Turning now to FIG. 4, shown is a flowchart that provides one example of the operation of a portion of the media application 133 according to various embodiments. It is understood that the flowchart of FIG. 4 provides merely an example of the many different types of functional arrangements that may be employed to implement the operation of the portion of the media channel application 133 as described herein. As an alternative, the flowchart of FIG. 4 may be viewed as depicting an example of steps of a method implemented in the computing environment 103 (FIG. 1) according to one or more embodiments.

In addition, the flowchart of FIG. 4 provides one example of how the media application 133 facilitates the identification and verification of events that occur within a media item 116 (FIG. 1) according to various embodiments. It is understood that the flow may differ depending on specific circumstances. Also, it is understood that other flows and user actions may be employed other than those described herein. The flowchart of FIG. 4 illustrates one embodiment where the media application 133 transmits a media item 116 and a respective request 117 (FIG. 1) to two or more clients 106 (FIG. 1) at the same time to facilitate a contest between individuals.

Beginning with box 403, when a user of a client 106 (FIG. 1) desires to select a category used to identify a subset of the requests 117 from the data store 113 (FIG. 1), the user may select one of the categories, whereupon the media application 133 receives a category selection from a client 106 (FIG. 1). In box 406, the media application 133 selects a subset of the requests 117 associated with a corresponding one of the media items 116 transmitted to one or more clients 106 and based on the category selection. Next, the media application 133 proceeds to box 409 and determines an order in which the requests 117 are transmitted serially to the client 106. In box 411, a media item 116 and an accompanying request 117 are encoded to be sent to a user. Next, the media application 133 proceeds to box 413 in which the media item 116 and the accompanying request 117 are transmitted or otherwise delivered to a user of a client 106. In one embodiment, each of the requests 117 may then be transmitted simultaneously to two or more clients 106. The media application 133 then proceeds to box 416.

In box 416, the media application 133 then determines whether one or more user replies 127 (FIG. 1) has been received from one or more clients 106. User replies 127 are the individual responses of each user to each of the inquiries 117. As an example, the user reply 127 may include a comment, user feedback and/or other information from a user of a client 106. Upon receipt of one or more user replies 127, the media application 133 proceeds to box 419. Otherwise, the media application 133 moves to box 433. If it is determined that a predefined timeout has occurred in box 433, then the media application 133 proceeds to box 434. A predefined timeout period may be specified as an appropriate time for a response from the users. In one embodiment, the timeout period is the same as the length of the media item 116 viewed by one or more users.

In box 434, the media application 133 determines if any user replies 127 were received before the predefined timeout period elapses. If so, then the media application 133 proceeds to box 424. Otherwise, the media application 133 ends as shown. A predefined amount of time may range from a few seconds to several minutes and/or other amount of time. If a timeout has not occurred in box 433, the media application 133 reverts back to box 416 described above.

Assuming a user reply 127 was received in box 419, then the media application 133 may send an optional notification to one or more users in real time at the client 106 that one or more of the other users has submitted a reply 127 in response to the request 117 so that such users are made aware of the answer given in much the same way as they may be able to be notified about a user reply 127 to a request 117 if they were all in the same room viewing, listening, and/or otherwise accessing the media item 116 together. The media application 133 facilitates sending notification to the other users that one or more users have submitted a user reply 127 in response to the request 117. The media application 133 also stores each of the user replies 127 in associated with the media item 116. The media application 133 then proceeds to box 423.

In box 423, the media application 133 determines whether all or a predefined number of the user replies 127 have been received. Assuming all or the predefined number of the user replies 127 have been received, the media application 133 moves to box 424. Otherwise, the media application 133 reverts back to box 413 to send the media item 116 and the request 117 to another user as described above.

In box 424, the media application 133 determines where a given event has occurred in the media item 116 from the relative placement of other user replies 127. In one embodiment, the media application 133 uses the number of timestamps that are close together as an indication that the event occurred at or near the point in time in the media item 116 where most of the timestamps are clustered. Once the media application 133 has determined that the event occurred at or near a specific point in time in the media item 116, the media application 133 then moves to box 426. In box 426, the media application 133 determines the degree to which each of the user replies 127 is deemed to be accurate. In one embodiment, the accuracy of a user reply 127 may be determined based on the relative placement of the user reply 127 with respect to the event located in the media item 116 and relative to the location of the other user replies 127. Alternatively, the media application 133 may determine whether the respective one of the user replies 127 is accurate based at least in part on a validation score. Each of the user replies 127 may include a timestamp that is used to identify that a certain event occurred within a media item 116 at a specific point in time. The validation score may be determined based on how close in time the timestamp associated with the respective one of the user replies 127 is to the point in time where an event is deemed to have occurred. For example, the validation score may be determined by examining the timestamps associated with the each of the user replies 127 and checking for verification in the form of other timestamps that are close in time relative to the time that an event is deemed to have occurred in the media item 116. In one embodiment, the user reply 127 having a validation score greater than or equal to a predefined threshold score is deemed to be accurate. The validation score may be based at least in part on the number of user replies 127 received with a predefined amount of time. For example, the predefined time may be set to five seconds and/or any other amount of time. As a non-limiting example, the media application 133 may receive all user replies 127 that are submitted within five seconds of the time in which the event is deemed to have occurred in the media item 116. Once the accuracy of each of the user replies 127 has been assessed, the media application 133 moves to box 429.

In box 429, the media application 133 may then award an amount of points to one or more of the users based at least in part the accuracy of their user replies 127. Alternatively, points may be awarded based on the relative placement of the user replies 127 within a cluster. Thereafter, the media application 133 ends.

Figure 5:
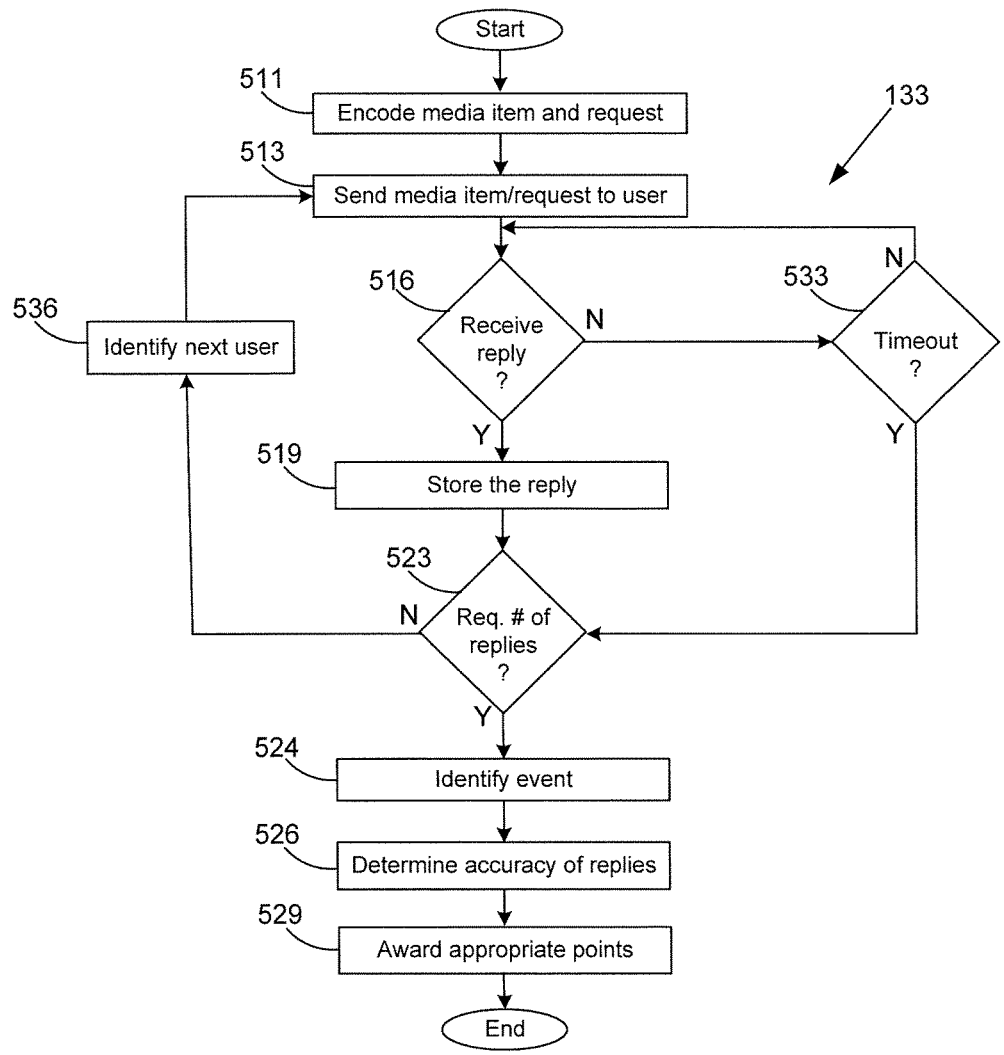

Referring now to FIG. 5, shown is a flowchart that provides one example of the operation of a portion of the media application 133 according to various embodiments. It is understood that the flowchart of FIG. 5 provides merely an example of the many different types of functional arrangements that may be employed to implement the operation of the portion of the media channel application 133 as described herein. As an alternative, the flowchart of FIG. 5 may be viewed as depicting an example of steps of a method implemented in the computing environment 103 (FIG. 1) according to one or more embodiments.

In addition, the flowchart of FIG. 5 provides one example of how the media application 133 facilitates the identification and verification of events that occur in a media item 116 (FIG. 1) according to various embodiments. It is understood that the flow may differ depending on specific circumstances. Also, it is understood that other flows and user actions may be employed other than those described herein. The flowchart of FIG. 5 illustrates one embodiment where media items 116 and a respective request 117 (FIG. 1) about the media item 116 are sent separately to a number of users. Specifically, the media item 116 may be sent to users one at a time to obtain user replies 127 (FIG. 1) and the process continues until a requisite number of user replies 127 has been received.

Beginning with box 511, a media item 116 and accompanying request 117 are encoded to be sent to a user in response to a request to take part in a contest received from the user.

Next, the media application 133 proceeds to box 513 in which the media application 133 and the accompanying request 117 are transmitted or otherwise supplied to a user. The media application 133 then proceeds to box 516.

In box 516, the media application 133 then determines whether a user reply 127 (FIG. 1) has been received from a respective client 106 (FIG. 1). The user reply 127 is the individual response of a user to the request 117. Upon receipt of the user reply 127, the media application 133 proceeds to box 519. Otherwise, the media application 133 proceeds to box 533.

In box 533, it is determined whether a predefined timeout has occurred. If it is determined that a predefined timeout has occurred in box 533, the media application 133 proceeds to box 523. A predefined timeout may be any period of time that is deemed appropriate to have received a user reply 127 given the time when the media item 116 and request 117 were sent to the user to solicit the user reply 127. If a timeout has not occurred in box 533, the media application 133 reverts back to box 516 described above. Thus, once requests are transmitted in box 513, the media application 133 essentially waits in a loop between boxes 516 and 533 for either a user reply 127 to be received or a timeout to occur.

Assuming that a user reply 127 was received as determined in box 516, in box 519 the media application 133 stores the user reply 127 in association with the respective user data 123 (FIG. 1). The media application 133 then proceeds to box 523. Alternatively, the media application 133 may have reached box 523 from box 533 due to a timeout as described above.

In box 523, the media application 133 determines whether a requisite number of user replies 127 have been received such that the location of an event can be ascertained from the user replies 127 as described above. In this respect, the requisite number of user replies 127 may be a predefined percentage of all user replies 127 sent that is deemed to provide enough information to perform the subsequent analysis to identify where or whether events occur in the media item 116.

Assuming the media application 133 has received the requisite number of user replies 127, the media application then proceeds to 524. Otherwise, the media application 133 proceeds to box 536 and identifies the next user to whom the request 117 is to be sent. Thereafter, the media application then proceeds to box 513 described above.

In box 524, the media application 133 determines where a given event has occurred in the media item 116 from the relative placement of the user replies 127 as described above. Alternatively, the media application may determine where an object appears in the media item 116. Still further, some other aspect of the media item 116 may be ascertained from the user replies 127. In one embodiment, the media application 133 identifies the locations of events based on the clustering of user replies 127 as described above.

Once the media application 133 has determined a location of an event at or near a specific point in time in the media item 116, the media application 133 then moves to box 526. In box 526, the media application 133 determines the degree to which each of the user replies 127 is deemed to be accurate. In one embodiment, the accuracy of a user reply 127 may be determined based on the relative placement of the user reply 127 with respect to the event located in the media item 116 and relative to the location of the other user replies 127.

The media application 133 may alternatively determine whether the respective one of the user replies 127 is accurate based at least in part on a validation score. Each of the user replies 127 may include a timestamp that is used to identify that a certain event occurred within a media item 116 at a specific point in time. The validation score may be determined based on how close in time the timestamp associated with the respective one of the user replies 127 is to the point in time where the occurrence of an event is deemed to have occurred. For example, the validation score may be determined by comparing the timestamps associated with the each of the user replies 127 and checking for verification in the form of other timestamps that are close in time relative to the actual time that an event occurred in the media item 116. In this respect, the more users that submit a user reply 127 near the first user to respond results in the calculation of a higher validation score for the first user. User replies 127 that are deemed outliers may receive a validation score of "0" or other number. Users that are in the middle of a cluster may be provided a validation score that is commensurate with the value they provide in verifying that the first user to answer relative to the cluster is correct.

Once the accuracy of each of the user replies 127 is assessed, then the media application 133 moves to box 529.

In box 529, the media application 133 may then award an amount of points to one or more of the users based the accuracy of their replies 127. Alternatively, points may be awarded based on the relative placement of user replies 127 within a cluster as mentioned above. In one embodiment, the points may be redeemed for some benefit. Thereafter, the media application 133 ends.

Figure 6:
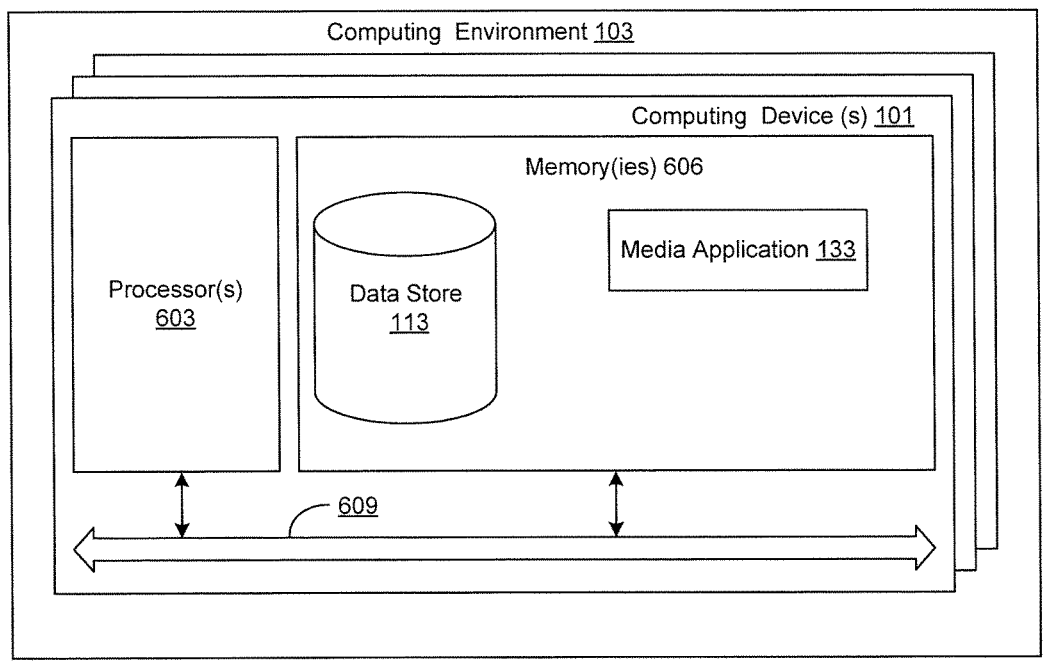
FIG. 6 is a schematic block diagram that provides one example illustration of a computing environment employed in the networked environment of FIG. 1 according to various embodiments of the present disclosure.

With reference to FIG. 6, shown is a schematic block diagram of the computing environment 103 according to an embodiment of the present disclosure. The computing environment 103 includes at least one processor circuit, for example, having a processor 603 and a memory 606, both of which are coupled to a local interface 609. To this end, the computing environment 103 may comprise, for example, at least one server computer or like computing device 101. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are media application 133, and potentially other applications. Also stored in the memory 606 may be a data store 113 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although media application 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4 and 5 show the functionality and operation of an implementation of portions of the media application 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including media application 133, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein when executed the program causes the computing device to at least:
   encode, over a network, for display a media item on a plurality of user devices, wherein the media item is selected from a playlist of media items displayed on a user interface of the plurality of user devices;
   generate a request for identifying a respective point in time of an occurrence of an event of the media item based at least in part on a plurality of events occurring in the media item;
   transmit the request to the plurality of user devices, wherein the request is rendered for display in the media item;
   determine that a plurality of messages have been received within a timeout period from the plurality of user devices in response to the request for identifying the occurrence of the event in the media item, wherein individual ones of the plurality of messages include a timestamp representative of the respective point in time of the occurrence of the event in the media item, wherein a length of the timeout period is based at least in part on a respective length of the media item; and
   determine the respective point in time that the event occurred in the media item based at least in part on a cluster of at least one subset of the plurality of messages received from the plurality of user devices, wherein the cluster of the at least one subset of the plurality of messages is determined based at least in part on a threshold number of the plurality of messages being received within a time period, wherein the time period is a subset of the timeout period.

2. The non-transitory computer-readable medium of claim 1, wherein the request comprises a plurality of requests that transmitted serially in an order based at least in part on the media item.

3. The non-transitory computer-readable medium of claim 1, wherein the program further causes the computing device to determine an order in which the individual ones of the plurality of messages have been received based at least in part on the timestamp included in the plurality of messages.

4. A system, comprising:
   at least one computing device; and
   an application executable in the at least one computing device, wherein when executed the application causes the at least one computing device to at least:
   encode, over a network, for display a media item on a plurality of clients;
   generate a request for identifying a respective point in time of an occurrence of an event of the media item based at least in part on a plurality of events occurring in the media item;
   transmit the request to the plurality of clients for identifying the respective point in time of the occurrence of the event in the media item, wherein the request is rendered for display on the plurality of clients;
   determine that a plurality of messages have been received within a timeout period from the plurality of clients that identify the occurrence of the event in the media item in response to the request, wherein individual ones of the plurality of messages comprises at least one timestamp representative of the respective point in time of the occurrence of the event in the media item, wherein a length of the timeout period is based at least in part on a respective length of the media item; and
   determine the respective point in time that the event occurred in the media item based at least in part on a number of the plurality of messages received and a cluster of at least one subset of the plurality of messages received, wherein the cluster of the at least one subset of the plurality of messages is determined based at least in part on a threshold number of the plurality of messages being received within a time period, wherein the time period is a subset of the timeout period.

5. The system of claim 4, wherein the application further causes the at least one computing device to render a user interface that comprises a category selector component, the category selector component being used to receive a category selection.

6. The system of claim 5, wherein the application further causes the at least one computing device to identify the media item from a subset of a plurality of respective media items based on the category selection.

7. The system of claim 5, wherein the application further causes the at least one computing device to select the request from a plurality of respective requests based at least in part on the category selection.

8. The system of claim 5, wherein the request comprises a plurality of requests, wherein the plurality of requests are transmitted based at least in part on a transmission order associated with the category selection.

9. The system of claim 4, wherein the media item and the request are simultaneously transmitted to the plurality of clients.

10. The system of claim 4, wherein the request is transmitted to each respective one of the plurality of clients at a separate point in time.

11. The system of claim 4, wherein encoding the media item further comprises rendering the media item and the request in a viewing window of a user interface.

12. The system of claim 4, wherein the application further causes the at least one computing device to at least award an amount of points to a respective user account associated with individual ones of at least a subset of a plurality of users.

13. The system of claim 12, wherein the amount of points is determined based at least in part on the at least one timestamp and the cluster of the at least one subset of the plurality of messages.

14. The system of claim 4, wherein the individual ones of the plurality of messages include user-feedback.

15. A method, comprising:
transmitting, by a computing device over a network, a media item to a plurality of clients;
generating, by the computing device, a request for identifying a respective point in time of an occurrence of an event of the media item based at least in part on a plurality of events occurring in the media item;
transmitting, by the computing device, the request to the plurality of clients, wherein the request is displayed on the plurality of clients;
determining, by the computing device, that a plurality of messages have been received within a timeout period from the plurality of clients in response to the request for identifying the occurrence of the event, wherein individual ones of the plurality of messages comprise a timestamp representative of a point in time in the media item, wherein a length of the timeout period is based at least in part on a respective length of the media item; and
determining, by the computing device, the respective point in time that the event occurred in the media item in response to the request based at least in part on a cluster of at least one subset of the plurality of messages, wherein the cluster of the at least one subset of the plurality of messages is determined based at least in part on a threshold number of the plurality of messages being received within a time period, wherein the time period is a subset of the timeout period.

16. The method of claim 15, further comprising receiving, by the computing device, a category selection from a user interface rendered on at least one of the plurality of clients.

17. The method of claim 16, further comprising generating, by the computing device, a media playlist in the user interface based at least in part on the category selection.

18. The method of claim 15, wherein transmitting the request comprises transmitting serially a plurality of requests based at least in part on a category selection received from at least one of the plurality of clients.

19. The method of claim 15, wherein a different version of the media item is transmitted to individual ones of the plurality of clients over the network.

20. The method of claim 15, wherein the threshold number for the cluster is based at least in part on a threshold percentage of a total number of the plurality of clients.

* * * * *